US007521493B2

(12) United States Patent
Frances et al.

(10) Patent No.: US 7,521,493 B2
(45) Date of Patent: Apr. 21, 2009

(54) SLURRIES CONTAINING MICROFIBER AND MICROPOWDER, AND METHODS FOR USING AND MAKING SAME

(75) Inventors: Arnold Frances, Glen Allen, VA (US); Achim Amma, Richmond, VA (US); Steven M. Hansen, Vienna, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 674 days.

(21) Appl. No.: 11/032,328

(22) Filed: Jan. 10, 2005

(65) Prior Publication Data

US 2006/0155011 A1 Jul. 13, 2006

(51) Int. Cl.
*C08K 7/00* (2006.01)

(52) U.S. Cl. ........................................ 523/220; 524/500

(58) Field of Classification Search ................. 523/220; 524/500

See application file for complete search history.

(56) References Cited

U.S. PATENT DOCUMENTS

| | | | |
|---|---|---|---|
| 2,999,788 | A | 9/1961 | Morgan |
| 3,767,756 | A | 10/1973 | Blades |
| 3,869,429 | A | 3/1975 | Blades |
| 3,869,430 | A | 3/1975 | Blades |
| 4,518,737 | A | 5/1985 | Traut |
| 4,938,952 | A | 7/1990 | Kamen et al. |
| 5,026,456 | A | 6/1991 | Hesler et al. |
| 5,028,372 | A | 7/1991 | Brierre et al. |
| 5,209,877 | A | 5/1993 | Frances et al. |
| 5,370,866 | A | 12/1994 | Frankfurt et al. |
| 5,416,156 | A | 5/1995 | Kamen |
| 5,474,842 | A | 12/1995 | Hoiness |
| 2004/0191192 | A1 | 9/2004 | Blankenbeckler et al. |

FOREIGN PATENT DOCUMENTS

| | | | |
|---|---|---|---|
| KR | 350364 | B | 8/2002 |
| WO | WO 99/23159 | | 5/1999 |
| WO | WO 03/044100 | A1 | 5/2003 |
| WO | WO 03-044250 | A1 | 5/2003 |
| WO | WO 2004/099474 | A2 | 11/2004 |

OTHER PUBLICATIONS

U.S. Appl. No. 11/032,575, filed Jan. 10, 2005, Hansen.

Dr. H. P. Schlumpf, 9 Fillers and Reinforcements, Plastic Additives, 9.3 Description of the individual fillers and reinforcements, 9.3.14.6 Whiskers, 1990, p. 553, 3rd Edition, Hanser Publishers, Munich Vienna New York.

*Primary Examiner*—Edward J Cain

(57) ABSTRACT

A slurry containing microfiber and micropowders, and a process for making such a slurry, are provided. The slurry containing microfibers and micropowders is more stable and easier to process, and the micropowder is less likely to separate out of the slurry or agglomerate in comparison to a slurry containing only micropowder.

3 Claims, 2 Drawing Sheets

SLURRIES CONTAINING MICROFIBER AND MICROPOWDER, AND METHODS FOR USING AND MAKING SAME

FIELD OF THE INVENTION

The present invention is directed to slurries containing at least one liquid medium, at least one microfiber and at least one micropowder, and to methods for making and using the slurries.

BACKGROUND OF THE INVENTION

Fiber or particulate additives can be incorporated into a wide variety of materials, such as, for example, polymers, water, polymer precursors, etc. to produce a wide variety of end products.

Particulate additives, such as fluoropolymer micropowders, for example, can be added to thermoplastic polymers used to produce industrial textiles, such as, for example, textile articles used in filtration and dewatering processes; carpeting; fabrics for sportswear and outerwear; hot-air balloons; car and plane seats; and umbrellas. Incorporating fluoropolymer micropowders, such as polytetrafluoroethylene (PTFE), into such polymers can produce textiles having certain advantages, such as, for example, textiles that are easier to clean, fibers having improved tensile strength, etc.

Fibers, for example, can be added to thermoplastic polymers used to produce composites, including advanced engineering composites. The reinforcing effects of the fibers may significantly modify the properties of the thermoplastic polymer. Advanced engineering composites having polyamide fibers, such as either Kevlar® fibers, or carbon fiber, incorporated into the thermoplastic polyester matrix of the resin are widely used in articles, such as, for example, sporting goods.

Fibers can also be incorporated into nail polish or paint coating compositions, and micropowders can be incorporated into various cosmetic products.

U.S. Pat. No. 5,370,866 relates to a colorless or colored nail polish containing, in a polish solvent system, a film-forming substance, a resin, a plasticizer, and 0.01 to 0.5 wt. % aramide fibers (poly[paraphenylene terephthalamide]).

U.S. Pat. No. 5,416,156 relates to a surface coating composition comprising, in combination, a fibrillated polymer matrix, at least one pigment, at least one binder, and at least one solvent, and a method for the manufacture thereof.

U.S. Pat. No. 4,938,952 relates to a cosmetic product including a cosmetic component as a pigment maintained within a matrix of fibrillatable polymer.

SUMMARY OF THE INVENTION

One aspect of the invention is a slurry comprising at least one liquid medium, at least one microfiber, and at least one micropowder.

Another aspect of the invention is a process for making a slurry comprising the at least one microfiber, the at least one micropowder, and the at least one liquid medium.

These and other aspects of the invention will be apparent to those skilled in the art in view of the following disclosure and appended claims.

DETAILED DESCRIPTION

Figure 1:
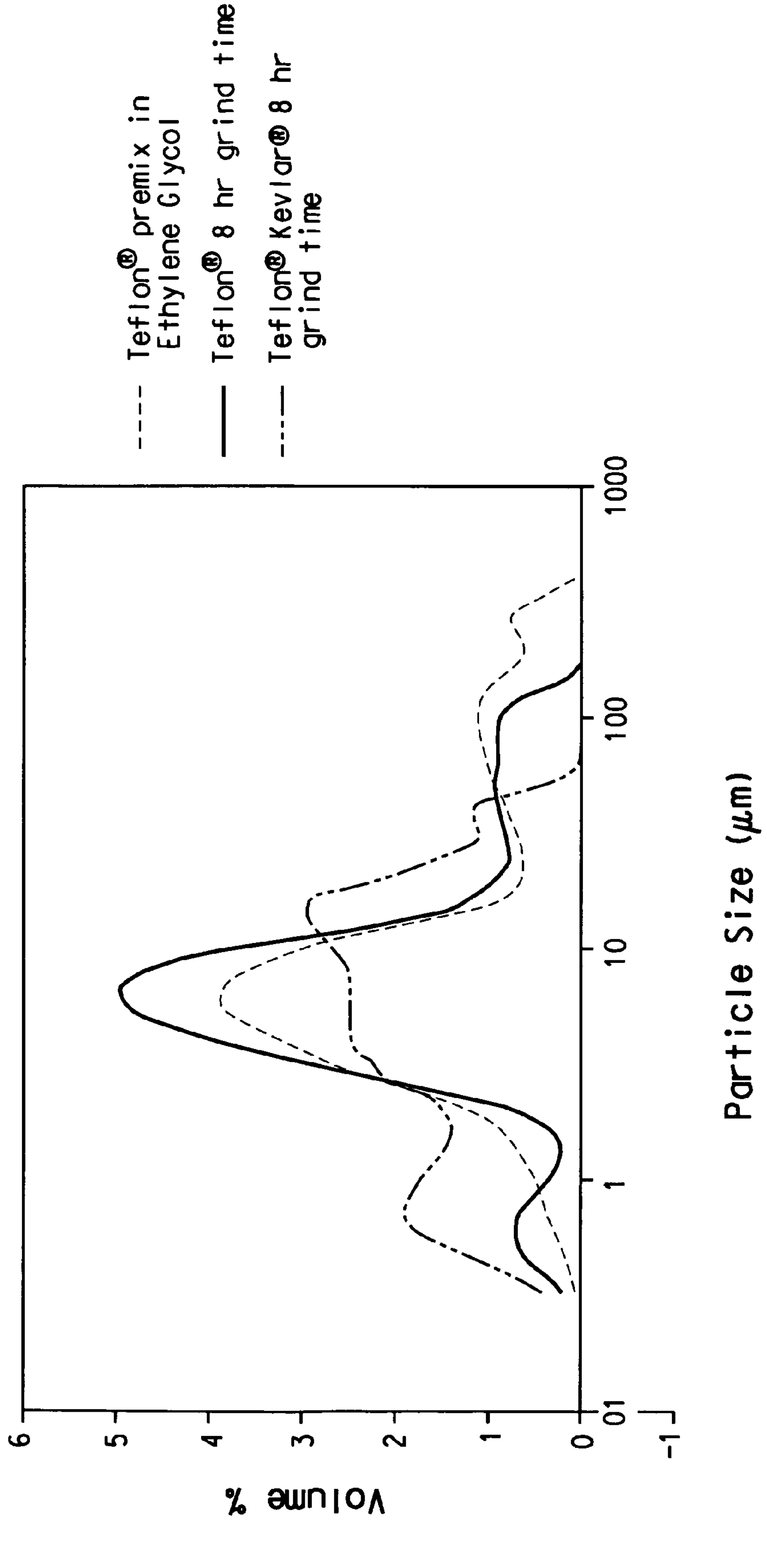
FIG. 1 is a graph illustrating the micropowder particle size distribution of various micropowder containing slurries.

The features and advantages of the present invention will be more readily understood by those of ordinary skill in the art upon reading the following detailed description. It is to be appreciated that certain features of the invention that are described herein in the context of separate embodiments, can also be combined to form a single embodiment. Conversely, various features of the invention that are described in the context of a single embodiment can be combined to form sub-combinations thereof.

In addition, unless specifically stated otherwise herein, references made in the singular also include the plural (for example, "a" and "an" may refer to one, or one or more). Furthermore, unless specifically stated otherwise herein, the minimum and maximum values of any of the variously stated numerical ranges used herein are only approximations understood to be preceded by the word "about" so that slight variations above and below the stated ranges can be used to achieve substantially the same results as those values within the stated ranges. Moreover, each of the variously stated ranges are intended to be continuous so as to include every value between the stated minimum and maximum value of each of the ranges.

Further, an amount, concentration, or other value or parameter given as a list of upper preferable values and lower preferable values, is to be understood as specifically disclosing all ranges formed from any pair of an upper preferred value and a lower preferred value, regardless of whether ranges are separately disclosed.

All patents, patent applications and publications referred to herein are incorporated herein by reference in their entirety.

The present invention provides a slurry comprising at least one liquid medium, from about 0.01 to about 15 wt. % of at least one microfiber, and from about 0.5 to about 50 wt. % of at least one micropowder, based on total weight of the slurry. A slurry containing at least one micropowder and at least one microfiber is more stable against separation of the micropowder from the slurry in comparison to a slurry that only contains micropowder. In addition, such a slurry has been found to effectively reduce agglomeration of the micropowder in comparison to a slurry that only contains micropowder. As a result, such slurries offer improved dispersion of the micropowder particles such that the dispersed particles are well separated and preferably do not reagglomerate.

The present invention also provides a process for making a slurry containing at least one liquid medium, at least one microfiber, and at least one micropowder. The process provides improved dispersion of the microfibers and micropowders in the liquid medium, such that the particles dispersed therein are well separated and preferably do not reagglomerate.

While is not intended that the present invention be bound by any particular theory, it is believed that the improved dispersion of the microfibers and micropowders is due in part to the physical interaction of particles having a dissimilar shape.

The term "slurry" is used herein to refer to compositions containing liquid medium, microfibers, micropowders and optional additives and/or processing aids.

The term "microfiber(s)" as used herein refers to "processed fiber" that can generally be described as fiber because of its aspect ratios. The microfibers preferably contained in the slurries, as disclosed herein, preferably have aspect ratios ranging from about 10:1 to about 1000:1, more preferably from about 10:1 to about 500:1, and even more preferably from about 25:1 to about 300:1. Preferably the microfibers have volume average lengths of from about 0.01 to about 100 microns, more preferably from about 0.1 to 100 microns, even more preferably from about 0.1 to about 50 microns, still more preferably from about 0.5 to about 50 microns, and most preferably from about 0.5 to about 25 microns. The microfibers preferably have diameters of from about 1 nm to about 12 microns, more preferably from about 5 nanometers to 1 micron, and most preferably from about 5 namometers to about 100 nanometers. Generally, the microfibers have an average surface area ranging from about 25 to about 500 $m^2$/gram. These dimensions, however, are only approximations. Moreover, the use of the term "diameter" is not intended to indicate that the microfibers are required to be cylindrical in shape or circular in cross-section. The aspect ratio, as used herein, thus refers to the ratio between the length (largest dimension) and the smallest dimension of the microfiber.

The microfibers may also be referred to as "nanofibers", which is an indication that in at least one dimension, the size of the fiber materials is on the order of nanometers. Microfibers, particularly when in the form of a slurry or dispersion, may also be referred to as either "micropulp", or "nanopulp". The term "microfibers" is used herein to refer to the processed fibers whether or not the fibers are contained in a slurry.

The term "micropowder(s)" is used herein to refer to finely divided, easily dispersed powders or particles with an average diameter preferably ranging from about 0.01 to about 100 microns, more preferably from about 0.1 to about 50 microns, and most preferably from about 0.5 to about 25 microns. The micropowders typically comprise organic or inorganic material(s).

The microfibers are produced from fiber starting material(s) and include, but are not limited to, organic and/or inorganic microfibers. The fiber starting material(s) include, but are not limited to organic and/or inorganic fibers.

The term "fiber" is used herein to refer to pulp, short fiber or fibrids. A pulp, such as, for example, an aramid pulp, which is particularly useful as a starting material in making the microfibers, can be prepared by refining aramid fibers to fibrillate the short pieces of aramid fiber material. Such pulps have been reported to have a surface area in the range of 4.2 to 15 $m^2$/g, and a Kajaani weight average length in the range of 0.6 to 1.1 millimeters (mm). Such pulps also have a high volume average length in comparison to micropulps. For example, Merge 1F543 aramid pulp available from DuPont, Wilmington, Del. has a Kajaani weight average length in the range of 0.6 to 0.8 mm, and, when laser diffraction is used to measure the pulp, a volume average length of about 0.5 to 0.6 mm. An alternate method of making aramid pulp directly from a polymerizing solution is disclosed in U.S. Pat. No. 5,028,372.

Short fiber (sometimes called floc) can be made by cutting a continuous filament into short lengths without significantly fibrillating the fiber. The short fiber typically ranges from about 0.25 mm to 12 mm in length. For example, the reinforcing fibers disclosed in U.S. Pat. No. 5,474,842 are suitable short fibers.

Fibrids are non-granular film-like particles having an average maximum length in the range of 0.2 to 1 mm with a length-to-width aspect ratio in the range of 5:1 to 10:1. The thickness dimension is on the order of a fraction of a micron. Aramid fibrids are well known in the art and can be made in accordance with the processes disclosed in U.S. Pat. Nos. 5,209,877; 5,026,456; 3,018,091; and 2,999,788. The processes typically include adding a solution of organic polymer in solvent to another liquid that is a non-solvent for the polymer but is miscible with the solvent, and applying vigorous agitation to cause the fibrids to coagulate. The coagulated fibrids are refined, separated, and dried to yield clumps of fibrids having a high surface area; the clumps are then opened to yield a particulate fibrid product.

Organic microfibers can contain any organic material(s) contained in the organic fibers. The organic material(s) include, but are not limited to, synthetic polymers, such as aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, and/or aromatic polyamides; natural fibers, such as cellulose, cotton, silk, and/or wool fibers; and mixtures thereof.

The commercially available organic fibers that can be used include, but are not limited to, ZYLON® PBO-AS (poly(p-phenylene-2,6-benzobisoxazole)) fiber, ZYLON® PBO-HM (poly(p-phenylene-2,6-benzobisoxazole)) fiber, available from Toyobo (Japan), and DYNEEMA® SK60 and SK71 ultra high strength polyethylene fiber, available from DSM (Netherlands); Celanese VECTRAN® HS pulp and EFT 1063-178, which are both available from Engineering Fibers Technology, Shelton, Connecticut; CFF Fibrillated Acrylic Fiber, which is available from Sterling Fibers, Inc., Pace, Fla.; and Tiara Aramid KY-400S Pulp, which is available from Daicel Chemical Industries, Ltd., Sakai City, Japan.

In some applications, the organic fibers are preferably made of aromatic polyamide polymers, especially poly(p-phenylene terephthalamide) and/or poly(m-phenylene isophthalamide), which are also known as aramid fibers. As used herein, an "aramid" is a polyamide having amide (—CONH—) linkages of which at least 85% are attached directly to two aromatic rings.

The organic fibers used to make the microfibers can also contain known additives. For example, the aramid fibers can have one or more other polymeric materials blended with the aramid. Specifically, the aramid fibers can contain up to about 10%, by weight, of other polymeric materials. If desired, copolymers of the aramid can have either as much as 10% of one or more other diamine substituted for the diamine of the aramid, or as much as 10% of other diacid chloride substituted for the diacid chloride of the aramid. Such organic fibers are disclosed in U.S. Pat. Nos. 3,869,430, 3,869,429, 3,767,756, and 2,999,788.

Preferably, the aromatic polyamide organic fibers used in accordance with the present invention are commercially available as KEVLAR®; KEVLAR® aramid pulp (available as merge 1F543 from DuPont, Wilmington, Del.); 1.5 millimeter (mm) KEVLAR® aramid floc (available as merge 1F561 from DuPont, Wilmington, Del.); and NOMEX® aramid fibrids (available as merge F25W from DuPont, Wilmington, Del.).

Inorganic fibers include, but are not limited to, fibers made of alumina; glass fibers; carbon fibers; carbon nanotubes; silica carbide fibers; mineral fibers made of, for example, wollastonite ($CaSiO_3$); and whiskers, which are single crystals of materials, such as, for example, silicon carbide, boron, and boron carbide, and are more fully described in *Plastics Additives,* 3rd, Gachter and Muller, Hanser Publishers, New York, 1990.

Micropowders suitable for use in accordance with the present invention include, but are not limited to, organic materials, inorganic materials, pulverized minerals, and combinations thereof.

The organic materials include, but are not limited to, organic polymers, such as, for example, the group of polymers known as tetrafluoroethylene (TFE) polymers. The TFE polymer group includes, but is not limited to PTFE homopolymers and PTFE copolymers, wherein the homopolymers and copolymers each individually contain small concentrations of at least one copolymerizable modifying monomer such that the resins remain non-melt-fabricable (modified PTFE).

The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include those derived from suspension polymerization, as well as, those derived from emulsion polymerization.

The pulverized minerals can be, for example, clays, talc, calcium carbonates or mica.

The inorganic materials can be, for example, precipitated and fumed silica, aluminum silicate, calcium sulfate, ferric or ferrous sulfate, titanium dioxide, aluminum oxide, and zinc oxide.

The micropowders suitable for use in accordance with the present invention are based on powdered organic polymers, pulverized minerals, and inorganic materials that are finely divided powders, or that have been reduced to finely divided powders by a grinding device(s). The variously available grinding devices include, but are not limited to, a hammer mill and/or a grinder. Acceptable grinding device(s) are well-known to a person of ordinary skill in the art.

Preferably, the micropowder is a fluoropolymer. More preferably, the micropowder is a TFE polymer. Most preferably, the micropowder is a PTFE powder, such as Zonyl® MP 1600 available from DuPont, Wilmington, Del., and has an average particle diameter of about 0.2 microns.

The microfiber and micropowder containing slurries can be produced by providing 1) an organic and/or inorganic fiber starting material that has not yet been reduced to microfibers, or 2) a microfiber containing slurry that contains organic and/or inorganic fibers that have already been reduced to microfibers. Microfibers can be made from the organic and/or inorganic fiber starting materials. Microfibers can be made in liquid media as disclosed herein, separated from liquid, and then used as needed.

If organic and/or inorganic fiber starting materials are provided, the amount of organic and/or inorganic fiber starting material(s) preferably ranges from about 0.01 to about 50 wt. %, based on total weight of the resulting slurry containing both microfiber and micropowder, more preferably from about 0.10 to about 25 wt. %, and most preferably from about 1 to about 10 wt. %. The organic and/or inorganic fiber starting material(s) can be combined with the micropowder and the liquid medium using conventional mixing and pumping equipment.

If a microfiber slurry is provided, the microfiber slurry preferably contains at least about 0.01 wt. % microfiber, based on total weight of the slurry. The microfiber slurry, however, can contain up to about 25 or 50 wt. % microfiber, based on total weight of the slurry, wherein the practical upper limit of the amount of microfiber in the slurry is determined by handling and equipment requirements. More preferably, the slurry contains at least about 0.1 wt. % microfibers, based on total weight of the slurry. The slurry preferably contains about 15 wt. % or less microfiber, based on total weight of the slurry, more preferably about 10 wt. % or less, and even more preferably, about 5 wt. % or less. In some preferred embodiments, the slurry contains from about 0.01 to about 50 wt. % microfibers, based on total weight of the slurry, preferably from about 0.1 to about 15 wt. % microfibers, more preferably from about 0.1 to about 10 wt. %, even more preferably from about 0.1 to about 5 wt. %, still more preferably from about 0.1 to about 2.5 wt. %, and most preferably from about 0.2 to about 1 wt. %. The slurry can be combined with the micropowder and liquid medium using conventional mixing and pumping equipment.

The microfiber containing slurry can be made from the same organic and/or inorganic fiber starting materials as the microfiber and micropowder containing slurry. The fiber starting material(s) can be processed into microfibers by premixing the starting material(s) and liquid medium a stirred tank mixer to distribute the starting materials in the liquid medium. The premix is subsequently agitated with a solid component in an agitating device to reduce the size of the starting material(s) and/or modify the shape of the materials. The processing of the starting material(s) into microfibers will preferably result in the microfibers being substantially uniformly dispersed in the liquid medium.

Optionally, after premixing the starting material(s) and liquid medium using a stirred tank mixer, forming a premix, the premix can be added to the chamber of an agitating device, which contains a solid component that may further aid in reducing the starting material(s) to microfibers. Any stirred tank mixer can be used to prepare the optional premix. Preferably, the agitator rotates at sufficient speed to create a vortex. A Cowles type agitator is particularly effective. The premix and solid component are subsequently agitated for an effective amount of time to produce a microfiber slurry containing microfibers having the desired size. After a slurry containing the desired microfiber sizes is obtained, the solid component can be removed.

Generally, the solid component is first placed in the agitation chamber of the agitating device and the premix is then added thereto. The order of addition, however, is not critical. For example, the liquid medium and solid component can be combined and added to the agitating device before the starting material(s) are added thereto or the starting material(s) and solid component can be combined and added to the agitating device before the liquid medium is added thereto. Likewise, the solid component, liquid medium, and starting material(s) can be combined and then added to the agitating device.

During agitation, the starting materials repeatedly come into contact with, and are masticated by, the optional solid component. A person of ordinary skill in the art is familiar with the types of agitating devices that can be used in accordance with the process of the present invention, such as for example, an attritor or a media mill.

The agitating devices can be batch or continuously operated. Batch attritors are well known. Suitable attritors include Model Nos. 01, 1-S, 10-S, 15-S, 30-S, 100-S and 200-S supplied by Union Process, Inc. of Akron, Ohio Another supplier of such devices is Glen Mills Inc. of Clifton, N.J. Suitable media mills include the Supermill HM and EHP models supplied by Premier Mills of Reading, Pa.

When an attritor is used, the agitation of the solid component is generally controlled by the tip speed of the stirring arms and the number of stirring arms provided. A typical attritor has four to twelve arms and the tip speeds of the stirring arms generally range from about 150 fpm to about 1200 fpm (about 45 meters/minute to about 366 meters/minute). The preferred attritor has six arms and is operated at tip speeds in the range of from about 200 fpm to about 1000 fpm (about 61 meters/minute to about 305 meters/minute), and more preferably from about 300 fpm to about 500 fpm (about 91 meters/minute to about 152 meters/minute).

When a media mill is used, the agitation of the solid component is generally controlled by the tip speed of the stirring arms or disks and the number of stirring arms/disks provided. A typical media mill has 4 to 10 arms/disks and the tip speed of the stirring arms/disks generally ranges from about 1500 fpm to about 3500 fpm (about 457 meters/minute to about 1067 meters/minute), and preferably from about 2000 fpm to about 3000 fpm (about 610 meters/minute to about 914 meters/minute).

The amount of solid component used in the agitating chamber is called the "load", and is measured by the bulk volume and not the actual volume of the agitating chamber. For example, a 100% load will only occupy about 60% of the chamber volume because the solid component contains substantial air pockets. The load added to the agitating chamber of a media mill or an attritor ranges from about 40% to about 90%, and preferably from about 75% to about 90%, based on full load. The load for a ball mill ranges from about 30% to about 60%, based on the full load. In practice, percent load is determined by first filling the agitating chamber with solid component to determine the weight of a full load, and then identifying the weight of the desired load as a percent of the full load.

Preferably, the liquid medium of the microfiber slurry includes at least one liquid selected from aqueous and non-aqueous solvents, monomers, water, resins, polymers, carriers, polymer precursors, and blends and mixtures thereof. Essentially, any material that is in liquid form or capable of being converted into a liquid can be used as the liquid medium, including solids that can be converted to a liquid at elevated temperatures. A person of ordinary skill in the art is familiar with the materials that can be used as the liquid medium. Suitable polymer precursors and a process for preparing a microfiber slurry suitable for incorporation into a polyester, are disclosed in co-owned patent application Ser. No. 10/428,294 entitled "Polymer Precursor Dispersion Containing a Micropulp and Method of Making the Dispersion", which is already incorporated herein by reference. A preferred polymer precursor is ethylene glycol. Similarly, liquid media in which the fibers used in preparing the microfibers and/or the micropowders can be dispersed for preparing the microfiber slurry, can be selected from aqueous and non-aqueous solvents; monomers; water; resins; polymers; carriers; polymer precursors; and blends and mixtures thereof.

The amount of liquid medium needed generally depends on the amount of slurry and the microfiber weight percent of the slurry being produced. That is, the amount of microfiber slurry needed and the desired microfiber weight percent of the microfiber slurry being produced dictate how much liquid medium needs to be used in making the microfiber slurry. A person of ordinary skill in the art can determine the amount of liquid medium needed to produce the desired amount of microfiber slurry having the desired microfiber weight percent.

The optional solid component preferably has a spheroidal shape. The shape of the solid component, however, is not critical, and includes, for example, spheroids; diagonals; irregularly shaped particles; and combinations thereof. The maximum average size of the solid component depends on the type of agitating device used. In general, however, the maximum average size of the solid component ranges from about 0.01 mm to about 127 mm in diameter.

For example, when attritors are used, the size of the solid component generally varies from about 0.6 mm to about 25.4 mm in diameter. When media mills are used, the diameter generally varies from about 0.1 to 3.0 mm, preferably from 0.2 to 2.0 mm. When ball mills are used, the diameter generally varies from about 3.2 mm to 76.2 mm preferably from 3.2 mm to 9.5 mm The solid component is generally chemically compatible with the liquid medium and is typically made of materials selected from: glass, alumina; zirconium oxide, zirconium silicate, cerium-stabilized zirconium oxide, yttrium-stabilized zirconium oxide, fused zirconia silica, steel, stainless steel, sand, tungsten carbide, silicon nitride, silicon carbide, agate, mullite, flint, vitrified silica, borane nitrate, ceramics, chrome steel, carbon steel, cast stainless steel, plastic resin, and combinations thereof. The plastic resins suitable for making the solid component include, but are not limited to, polystyrene; polycarbonate; and polyamide. Glass suitable for the solid component includes lead-free soda lime, borosilicate, and black glass. Zirconium silicate can be fused or sintered.

The most useful solid components are balls made of carbon steel, stainless steel, tungsten carbide, or ceramic. If desired, a mixture of balls having either the same or different sizes and being made of either the same or different materials can be used. Ball diameter can range from about 0.1 mm to 76.2 mm and preferably from about 0.4 mm to 9.5 mm, more preferably from about 0.7 mm to 3.18 mm. Solid components are readily available from various sources, including, for example, Glenn Mills, Inc., Clifton, N.J.; Fox Industries, Inc., Fairfield, N.J.; and Union Process, Akron, Ohio In producing the slurries, the micropowder can be added either as a dry powder, or as a micropowder containing slurry.

The micropowder as a dry powder can either be combined with the organic and/or inorganic fiber starting material(s) before the fibers are reduced to microfibers, or can be combined with the microfiber slurry, which has already been produced from the organic and/or inorganic fiber starting material(s). The dry powder and liquid medium can then be combined with either the organic and/or inorganic fiber starting materials, or the already prepared microfiber containing slurry via conventional mixing and pumping equipment.

If a micropowder slurry is used, the slurry preferably contains at least about 0.5 wt. % micropowder, based on total weight of the slurry. The micropowder slurry, however, can contain up to about 50 wt. % micropowder, based on total weight of the slurry, wherein the practical upper limit of the amount of micropowder is determined by slurry viscosity and material handling capabilities. More preferably, the slurry contains at least about 1 wt. % micropowder, based on total weight of the slurry, and even more preferably at least about 2 wt. % micropowder. Also, the slurry preferably contains about 25 wt. % or less micropowder, based on total weight of the slurry, more preferably about 20 wt. % or less micropowder, and even more preferably about 10 wt. % or less micropowder. In some preferred embodiments, the slurry contains from about 0.5 wt. % to about 50 wt. % micropowder, based on total weight of the slurry, preferably from about 1 wt. % to about 25 wt. %, even more preferably from about 1 wt. % to about 20 wt. %, and most preferably from about 1 to about 10 wt. %. The micropowder slurry can either be combined with the organic and/or inorganic fiber starting material(s) before the fibers are reduced to microfibers, or can be combined with the microfiber slurry, which has already been produced from the organic and/or inorganic fiber starting material(s). The micropowder slurry, liquid medium, and either the organic and/or inorganic fiber starting materials, or the already prepared microfiber containing slurry can be combined with conventional mixing and pumping equipment.

The micropowder slurry is generally prepared by the same methods as described hereinabove for preparing a slurry containing microfibers. That is, in general the micropowder is contacted with a liquid medium and optional solid component followed by agitating the micropowder, liquid medium and optional solid component in a mill, such as a ball mill to substantially uniformly disperse the micropowder in the liquid medium. A person of ordinary skill in the art, however, is familiar with other acceptable processes for preparing a micropowder slurry. For example, the micropowder and liquid medium can first be combined to form a premix. The premix can be subsequently combined with the solid component and agitated in the agitating device (when the agitating device is an attritor). Alternatively the premix can be subsequently fed to the agitating device already containing the solid component (when using a media mill). Regardless of the nature of the agitating device, after being agitated for an effective amount of time to produce a micropowder slurry containing micropowders having the desired size and uniform distribution, the solid component is removed.

Like the process used to prepare the microfiber slurry, the order in which the micropowder, solid component, and liquid medium are combined is not critical. In addition, the same stirred tank mixers, solid components, liquid medium, and agitating devices used to prepare the microfiber slurry can be used to prepare the micropowder slurry. The same methods used to determine the amount of liquid medium to add to the microfiber slurry can be used to determine the amount of liquid medium to add to the micropowder slurry.

A slurry containing both the micropowder and microfiber preferably contains at least about 0.01 wt. % microfiber and at least about 0.5 wt. % micropowder, based on total weight of the slurry. This slurry, however, can contain up to about 15 wt. % microfibers and up to about 50 wt. % micropowder, based on total weight of the slurry, wherein the practical upper limit of the amount of microfibers and micropowders in the slurry is determined by viscosity and material handling. More preferably, the slurry contains at least about 0.2 wt. % microfiber and at least about 2 wt. % micropowder, based on total weight of the slurry. The slurry preferably contains about 15 wt. % or less microfibers and about 30 wt. % or less micropowder, based on total weight of the slurry; more preferably about 10 wt. % or less microfibers and about 25 wt. % or less micropowder; and even more preferably about 5 wt. % or less microfibers and 20 wt. % or less micropowder.

In some preferred embodiments, the microfiber and micropowder containing slurry contains from about 0.01 to about 15 wt. % microfibers and from about 0.5 to about 50 wt. % micropowder, based on total weight of the slurry; preferably from about 0.2 to about 15 wt. % microfiber and from about 1 to about 30 wt. % micropowder; more preferably from about 0.2 to about 10 wt. % microfiber and from about 2 to about 25 wt. % micropowder; even more preferably from about 0.2 to about 5 wt. % microfiber and from about 2 to about 20 wt. % micropowder; and most preferably from about 0.2 to about 2.5 wt. % microfiber and from about 5 to about 20 wt. % micropowder.

A slurry containing both micropowder and microfibers is generally prepared by the same methods as described hereinabove for preparing the microfiber containing slurry or the micropowder containing slurry. If a microfiber containing slurry is used instead of organic and/or inorganic fiber starting material(s), however, an acceptable micropowder and microfiber containing slurry can be produced by simply premixing the microfiber containing slurry, liquid medium, and micropowder in a stirred tank mixer.

The premix does not have to be further agitated with a solid component to produce the micropowder and microfiber containing slurry. The premix produced by combining the microfiber slurry instead of organic and/or inorganic fiber starting material(s) with liquid medium and micropowder in a stirred tank mixer, however, can be conveyed to the agitation chamber of an agitation device optionally containing solid component, and further processed in accordance with the same methods as described hereinabove for preparing the microfiber containing slurry or the micropowder containing slurry. Preferably, the micropowder is added before the agitation begins.

If organic and/or inorganic fiber starting material(s) are used instead of a microfiber containing slurry, the organic and/or inorganic fiber starting material(s) are first premixed with liquid medium in the stirred tank mixer, and then conveyed to the agitation chamber of the agitation device. The micropowder can be optionally premixed with the organic and/or inorganic fiber starting material(s) and liquid medium in the stirred tank mixer. Preferably, the micropowder is added before agitation and size reduction are started. Preferably, the agitation chamber contains a solid component.

Like the process used to prepare the microfiber slurry or the micropowder slurry, the same stirred tank mixers, solid components, liquid medium, and agitating devices can be used in preparing the microfiber and micropowder containing slurry. In addition, the same methods used to determine the amount of liquid medium to add to the microfiber or micropowder containing slurries can be used in determining the amount of liquid medium to add to the micropowder and microfiber containing slurry.

If a solid component is used, the micropowders and either the organic and/or inorganic fiber starting material(s), or the microfibers of the microfiber containing slurry will repeatedly come into contact with, and be masticated by, the optional solid component while being agitated. Although various agitating devices can be used, a media mill (for semi-continuous processes) or attritor (for batch processes) is preferred. The agitating device can be batch or continuously operated.

When an attritor is used in preparing the microfiber and micropowder containing slurry of the invention, the solid component is preferably poured into the agitation chamber of the attritor. The fiber, micropowder, and liquid medium can then be added directly to the agitation chamber of the attritor without premixing any of the ingredients in the stirred tank mixer. Any of the ingredients, however, can be premixed in the stirred tank mixer prior to being added to the agitation chamber of the attritor. The solid component is maintained in an agitated state by, for example, the at least one stirring arm of the attritor.

When a media mill is used to in preparing the microfiber and micropowder containing slurry, the fiber or microfiber, micropowder, and liquid medium are preferably premixed in the stirred tank mixer and then pumped into the agitation chamber of the media mill. Prior to pumping the premix into the agitation chamber, the solid component is added to the agitation chamber. The premix and solid component are subsequently agitated by at least one stirring arm/disk of the mill. The solid component is maintained in an agitated state by, for example, the at least one stirring arm of the mill.

Unlike the conventional grinding or chopping processes that tend to largely reduce only fiber length, albeit with some increase in surface area and fibrillation, the fiber or microfiber size reduction in of the process of the present invention results from both longitudinal separation of the organic and/or inorganic fibers/microfibers into substantially smaller diameter fibers along with a reduction in the length of the fibers. On average, fiber length and/or diameter reductions of one, two or even greater orders of magnitude can be attained with organic and/or inorganic fiber starting material(s).

The agitating step is continued for an effective amount of time to produce a slurry containing substantially uniformly dispersed micropowders and microfibers having the desired sizes/lengths. It may be desirable, when using a mill, to incrementally produce the microfiber and micropowder containing slurry by repeatedly passing the liquid medium containing the microfibers, and at least one micropowder through the agitation device. When a mill is used, the time for which specific components are actually in the mill determines the size of the product.

When the optional solid component is used, the surface of the microfiber is fully wetted and uniformly distributed/dispersed in the slurry with minimal agglomerations or clumps. Likewise, the at least one micropowder is uniformly distributed/dispersed in the slurry with minimal agglomerations or clumps.

When a vertical media mill is used, the rate at which the microfiber and micropowder containing slurry is produced can be accelerated by circulating the solid component during the agitating step through an external passage typically connected near the bottom and top of the chamber of the vertical media mill. The rate at which the solid component is agitated depends on the physical and chemical make-up of the starting material, the size and type of the solid component, the length of time available for producing an acceptable slurry, and the size of the microfibers desired.

Upon obtaining a satisfactory microfiber and micropowder containing slurry, the solid component is normally removed from the slurry. Typically, the solid component remains in the agitation chamber. Some conventional separation processes, however, include a mesh screen that has openings small enough for the microfiber and micropowder containing slurry to pass through, while preventing the solid component from passing through. After removing the solid component, the microfiber and micropowder slurry can be used directly. Typically, the slurry will only contain negligible grit or seed that can be visually observed.

The microfiber and micropowder containing slurries can also contain conventional including, but not limited to, dyes, pigments, antioxidants, plasticizers, UV absorbers, stabilizers, rheology control agents, flow agents, metallic flakes, toughening agents, fillers, and carbon black. The type and amount of conventional additives used will of course depend on the intended use of the microfiber and micropowder containing slurry and the desired properties of the final product being produced therefrom. It is understood that one or more of these conventional additives can be added either during the premixing step, or before, during, or at the end of the agitating step.

The micropowder and microfiber containing slurries can be used to prepare a variety of products, including cosmetics, nail polish, paint coating compositions, fibers, films, monofilaments, molded parts, and can be used in a variety of materials, including resins, and polymeric materials, including thermosets, thermoplastics, and elastomers.

EXAMPLES

The present invention is further defined in the following Examples. It should be understood that these Examples are given by way of illustration only. From the above discussions and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth hereinbelow, but rather is defined by the claims contained hereinbelow.

Comparative Example 1

A premix slurry containing micropowder was prepared by premixing adding ethylene glycol and 3% Teflon® PTFE micropowder (Zonyl® 1600N MP sold by DuPont, Wilmington, Del.) to with a tank Cowles blade mixer supplied by Premier Mill, Inc., Reading, Pa. The Cowles blade mixer contained a high speed agitator that operated at a speed ranging from about 100 to about 1000 rpm. The weight percentages were based on the total weight of the slurry. A person of ordinary skill in the art knows how to determine the amount of micropowder to add to obtain the desired micropowder weight percentage.

The premix was observed to be very lumpy, not homogeneous at all, and separated out of the ethylene glycol if not agitated. The PTFE micropowder was observed to-settling quickly to the bottom of the container.

The premix was subsequently added to a Premier SML media mill (1.5 L Supermill) supplied by Premier Mill, Inc., Reading, Pa. Prior to adding the premix, however, a sample of the premix was collected to measure the particle sizes of the PTFE micropowder contained in the premix. In addition, 1035 ml of 1.0 mm solid ceramic spherical media available under the tradename Mill Mates supplied by Premier Mill, Inc., Reading, Pa. was added to the media mill before the premix was added. A Beckman Coulter LS200 particle size analyzer supplied by Beckman Coulter, Inc., Fullerton, Calif. was used to analyze the size of the micropowder particles contained in the premix.

The particle size of the micropowder for a given mill setup, i.e. mill type, media type, processing speed, etc. was controlled by the residence time of the premix in the milling chamber of the media mill. Residence time is a function of free mill volume, total liquid batch size, and total run time.

An initial batch size of 8500 grams was run in recirculation for 8 hours. After 8 hours, a second sample was collected to analyze the size of the micropowder particles contained in the resulting slurry. The PTFE micropowder of the resulting slurry was again observed settling to the bottom of the container.

The mean particle size of the micropowder particles contained in the Teflon® micropowder slurry samples is set forth in Table A. A graph depicting the particle size distribution of the micropowder particles contained in the Teflon® micropowder slurry samples is set forth in FIG. 1.

Example 1

A premix slurry containing micropowder and fiber was prepared by premixing ethylene glycol, 1.5% KEVLAR® pulp 1F543 sold by DuPont, Wilmington, Del. and 1.5% Teflon® PTFE micropowder (Zonyl® 1600N MP sold by DuPont, Wilmington, Del.) with a Cowles blade mixer supplied by Premier Mill, Inc., Reading, Pa. The Cowles blade mixer contained a high speed agitator that operated at a speed ranging from about 100 to about 1000 rpm. The weight percentages were based on the total weight of the slurry.

The premix was subsequently added to a Premier SML media mill (1.5 L Supermill) supplied by Premier Mill, Inc., Reading, Pa. The media mill had a 5 plastic disk set up and a 1.38 liter working capacity. Prior to adding the premix, 1035 ml of 1.0 mm solid ceramic spherical media available under the tradename Mill Mates supplied by Premier Mill, Inc., Reading, Pa. was added to the mill so that the mill contained a 75% load of spherical media.

The particle size of the micropowder for a given mill setup, i.e. mill type, media type, processing speed, etc. was controlled by the residence time of the premix in the milling chamber of the media mill. Residence time is a function of free mill volume, total liquid batch size, and total run time.

After the premix was added to the media mill, the premix and solid media were agitated for 8 hours. The resulting slurry appeared to be stable and was much more viscous than the micropowder slurry of Comparative Example 1. There was no visible separation or settling.

A Beckman Coulter LS200 particle size analyzer supplied by Beckman Coulter, Inc., Fullerton, Calif. was used to measure the size of the micropowder particles contained in the resulting slurry. The mean particle size of the micropowder particles contained in the Teflon® micropowder and Kevlar® microfiber containing slurry are set forth in Table A. A graph depicting the particle size distribution of the micropowder particles contained in the Teflon® micropowder and Kevlar® microfiber containing slurry is set forth in FIG. 1.

It is of import to note that the particle size analyzer could not distinguish between the Kevlar® microfibers and the Teflon® micropowder particles present in the microfiber and micropowder containing slurry. As a result, the largest and smallest micropowder particles could not be specificially identified, but the largest particle was clearly reduced to about 70 microns and possibly to particle sizes even smaller than 70 microns if the 70 micron size particles were actually Kevlar® microfibers. Although the actual size of the largest Teflon® micropowder particles in the slurry could not be determined, the size of the micropowder particles was 70 microns or less, which was considerably smaller than the Comparative Example 1 premix and slurry, which only contained Teflon® micropowder and no Kevlar® fibers/microfibers.

TABLE A

| Examples | Mixture | Mean Particle Size (microns) | Largest Particle Size (microns) |
|---|---|---|---|
| Comp. Ex. 1 | Teflon ® (pre-grind) | 43 | >600 |
| | Teflon ® (8 hr grind) | 17 | 194 |
| Ex. 1 | Teflon ®/Kevlar ® (8 hr grind) | 10 | 70 |

The Teflon® micropowder containing slurry premix had a mean micropowder particle size of 43 microns with the largest measured particle size being >600 microns. After the premix was subjected to 8 hours of grinding, the mean particle size of the micropowder particles was reduced to 17 microns with the largest measured particle size being 194 microns.

After the Teflon® micropowder and Kevlar® microfiber containing slurry premix was subjected to 8 hours of grinding, the slurry contained a mean particle size of 10 microns with the largest measured particle having a size of 70 microns.

The Zonyl® 1600N micropowder used in producing the slurries of Comparative Example 1 and Example 1 had a beginning mean micropowder particle size of 12 microns. The data in Table A indicate that prior to being ground the micropowder contained in the Comparative Example 1 slurry apparently underwent a considerable amount of agglomeration upon being premixed with the ethylene glycol. The data of Table A further indicate that the agglomerated micropowder contained in the Comparative Example 1 slurry premix was reduced by subjecting the slurry premix to 8 hours of grinding. The resulting Comparative Example 1 micropowder slurry, however, still contains particles with a mean particle size of 17 microns and agglomerates as large as 194 microns. Moreover, the micropowders contained in the Comparative Example 1 slurries were observed to readily separate out of the ethylene glycol and settle to the bottom of the container.

The data of Table A further indicate that co-grinding micropowder and fiber in ethylene glycol produced in Example 1 micropowder and microfiber containing slurry had a mean particle size of 10 microns, considerably smaller than the 17 micron and 47 micron mean particle sizes of the Comparative Example 1 slurries.

The Table A data further indicate that the largest measured particle of the Example 1 slurry was 70 microns, whereas the largest measured particles of the Comparative Example 1 slurries were >600 microns and 194 microns. Again, the 70 micron measurement for the largest particle of Example 1 is considerably smaller than >600 micron and 194 micron measurement for the largest particles of Comparative Example 1. Moreover, in contrast to the slurries of Comparative Example 1, the Example 1 slurry was observed to be stable with no apparent particle separation.

Although the particle size analyzer cannot distinguish between the microfiber and micropowder particles, the largest particle was clearly reduced to 70 microns and possibly to particle sizes even smaller than 70 microns if the 70 micron size particles were actually Kevlar® microfibers. In addition, while the actual size of the largest Teflon® micropowder particle cannot be determined for the microfiber and micropowder containing slurry of Example 1, the size of the micropowder particles must be 70 microns or less, which is considerably smaller than the micropowder particles of the Comparative Example 1 slurries, which only contained Teflon® micropowder and no Kevlar® fibers/microfibers.

As the slurries of Comparative Example 1 and Example 1 were prepared under the same processing conditions and procedures and with the same equipment, etc., the Kevlar® fibers are believed to have contributed to the smaller micropowder particle sizes of the Example 1 slurry, as well as the better stability and decreased separation of the dispersed micropowder particles.

Example 2

A microfiber and micropowder slurry was prepared by premixing 1 wt. % KEVLAR® pulp (merge 1F543 sold by DuPont, Wilmington, Del.), 20 wt. % titanium dioxide (Ti-Pure R-706 sold by DuPont, Wilmington, Del.), and 79 wt. % deionized water with a Cowles blade mixer supplied by Premier Mill, Inc., Reading, Pa. The Cowles blade mixer contained a high-speed agitator that operated at a speed ranging from about 100 to about 1000 rpm. The weight percentages were based on the total weight of the slurry. A person of ordinary skill in the art knows how to determine the amount of fiber, micropowder and deionized water to add to obtain the desired microfiber, micropowder, and deionized water weight percentages.

The premix was added to a Premier SML media mill (1.5 L Supermill) supplied by Premier Mill, Inc., Reading, Pa. Prior to adding the premix, the mill was filled to 75 vol. % with 0.7-1.2 mm Ce-stabilized zirconia media. The tip speed of the mill was set to 731.5 meters per minute (2400 fpm). The premix was run in recirculation for 720 min with a throughput of 296 g/min. Throughout the run, seven 1 L samples of the slurry were collected in separate sample bottles, and placed on a flat surface to study the sedimentation behavior of the particles contained in the slurry. After 10 months, the sedimentation was quantified by the ratio of the distance from the bottom of the sample bottle to the top level of the settled solids divided by the distance from the bottom of the sample bottle to the liquid meniscus. The sedimentation findings are summarized in Table B.

Comparative Example 2

A titanium dioxide premix slurry was prepared by premixing 20 wt. % titanium dioxide micropowder (Ti-Pure R-706 sold by DuPont, Wilmington, Del.) and 80 wt. % deionized water with a Cowles blade mixer supplied by Premier Mill, Inc., Reading, Pa. The Cowles blade mixer contained a high-speed agitator that operated at a speed ranging from about 100 to about 1000 rpm. The weight percentages were based on the total weight of the slurry. A person of ordinary skill in the art knows how to determine the amount of micropowder and deionized water to add to obtain the desired micropowder, and deionized water weight percentages.

The premix was added to a Premier SML media mill (1.5 L Supermill) supplied by Premier Mill, Inc., Reading, Pa. Prior to adding the premix, the mill was filled to 75 vol. % with 0.7-1.2 mm Ce-stabilized zirconia media. The tip speed of the mill was set to 731.5 meters per minute (2400 fpm). The premix was run in recirculation for 720 min with a throughput of 296 g/min. Throughout the run, seven 1 L samples of slurry were collected in separate sample bottles, and placed on a flat surface to study the sedimentation behavior of the particles contained in the slurry. After 8 months, the sedimentation was quantified by the ratio of the distance from the bottom of the sample bottle to the top level of the settled solids divided by the distance from the bottom of the sample bottle to the liquid meniscus. The sedimentation findings are summarized in table B.

TABLE B

| Examples | Sample No. | Liquid Fill Height (cm) | Solids Fill Height (cm) | Solids Height to Liquid Height Ratio | Mill Time (min) |
|---|---|---|---|---|---|
| Ex. 2 | 1 | 16.5 | 9 | 0.5 | 15 |
| | 2 | 16.5 | 9 | 0.5 | 45 |
| | 3 | 16.0 | 9 | 0.6 | 90 |
| | 4 | 16.0 | 10.8 | 0.7 | 180 |
| | 5 | 16.0 | 13 | 0.8 | 360 |
| | 6 | 14.0 | 12.5 | 0.9 | 540 |
| | 7 | 14.2 | 13.7 | 1.0 | 720 |
| Comp. Ex. 2 | 1 | 16.5 | 6 | 0.4 | 15 |
| | 2 | 16.8 | 6.5 | 0.4 | 45 |
| | 3 | 14.5 | 5.6 | 0.4 | 90 |
| | 4 | 16.5 | 7 | 0.4 | 180 |
| | 5 | 15.3 | 7.8 | 0.5 | 360 |
| | 6 | 14.9 | 7.4 | 0.5 | 540 |
| | 7 | 16.8 | 8.6 | 0.5 | 720 |

As shown in table B, the height of the solids in the Example 2 sample bottles increased as the mill time increased. That is, the solids height to liquid height ratio of the Example 2 samples increased from 0.5 to 1.0 as the mill time increased. The solid height to liquid height ratio of the Comparative Example 2 samples, however, did not increase as the milling time increased. The increase of the Example 2 ratios as the milling time increased indicates that KEVLAR® microfibers can be used to disperse titanium dioxide in water.

Figure 2:
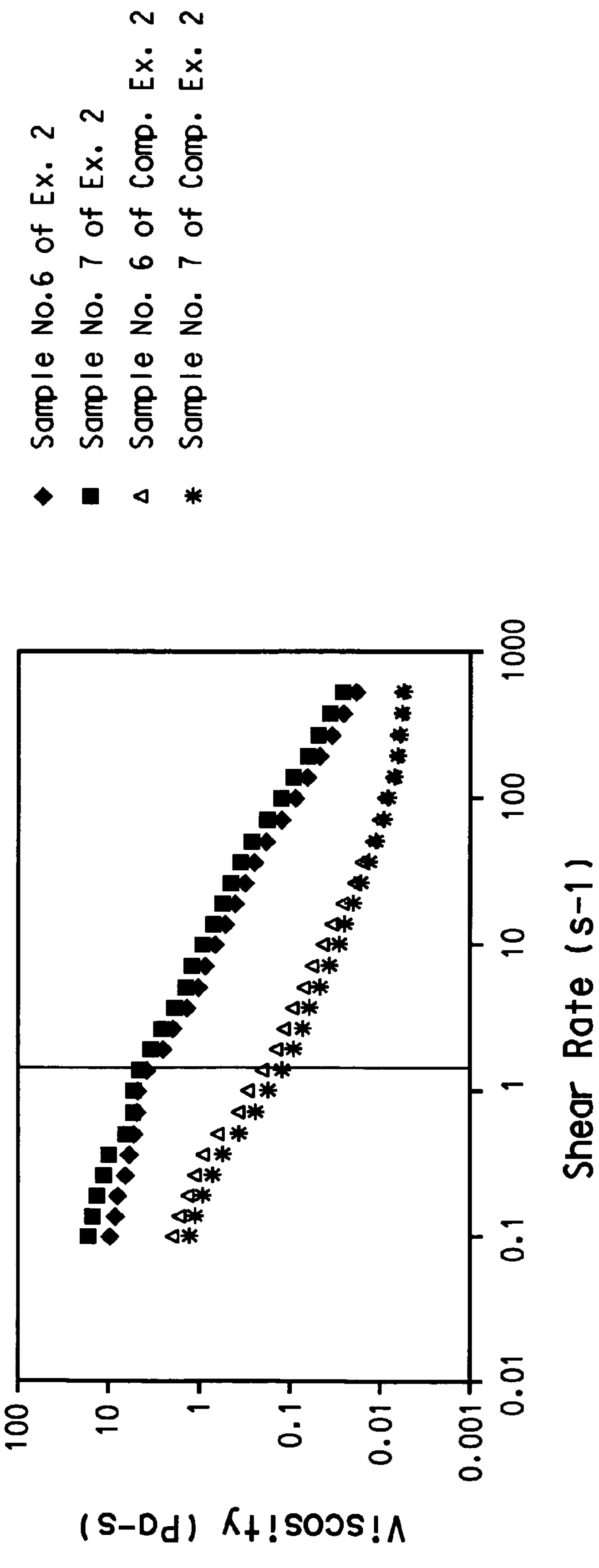
FIG. 2 is a graph illustrating the rheology characteristics of a titanium dioxide slurry containing microfibers in comparison to a titanium dioxide slurry that does not contain microfibers.

The rheology characteristics of two of the Example 2 samples and two of the Comparative Example 2 samples were investigated using a TA Instruments AR2000N rotational rheometer, supplied by TA Instruments, New Castle, Del. The results are summarized in FIG. 2.

Example 3

A nominal 4000 lb vertical autoclave with an agitator, vacuum jets and a monomer distillation still located above the clave portion of the autoclave was used to prepare several batches of polymer containing milled Kevlar® (poly(p-phenyleneterephtalamide) (available from DuPont Wilmington, Del.) microfiber and Zonyl MP-1600 (finely divided PTFE micropowders available from DuPont, Wilmington, Del).

The monomer distillation still was charged with approximately 1500 liters (approximately 3800 lbs) of dimethyl terephthalate (DMT) and approximately 650 liters of ethylene glycol. In addition, approximately 420 lbs of a 1% Kevlar® slurry (1% fiber in ethylene glycol) and approximately 1400 lbs of a 14% Zonyl® MP-1600N slurry (14% PTFE micropowder in ethylene glycol) were added to the still. Finally, manganese acetate as a solution in ethylene glycol was added as the ester exchange catalyst, and antimony trioxide as a solution in ethylene glycol was added as the polycondensation catalyst. All of the ingredients in the still were agitated to blend. The temperature of the still was raised to approximately 250° C. over a period of about 180 minutes. Atmospheric pressure was maintained in the still during the ester exchange reaction. An estimated 1300 lbs (approximately 700 liters) of methanol distillate was recovered. Molten monomer, bis(2-hydroxyethyl terephthalate), that is produced was then dropped from the monomer distillation still to the clave portion of the autoclave.

The ingredients were mixed, agitated, and polymerized by increasing the temperature to a final polymerization temperature of approximately 295° C. The pressure was reduced to a final pressure of about 1 mm Hg over a period of about 180 minutes. The resulting polymer was extruded through a 33 hole casting plate into strands, which are then quenched, cut, and boxed.

The resulting polymer was tested and found via the solution method to have an intrinsic viscosity (IV) of about 0.58 (Goodyear method). The resulting polymer was further found via Differential Scanning Calorimetry (DSC) methods to have a crystallization temperature of about 125° C. and a melt temperature of about 258° C.

Examples 4-8

A nominal 100 lb autoclave with an agitator, vacuum and a monomer distillation still located above the clave portion of the autoclave was used to prepare several batches of polymer containing milled Keviar® microfiber and Zonyl® MP-1600N (PTFE) micropowder. The compositions of the resulting Example 4-8 polymers were set forth in Table C.

In preparing the Example 4-8 polymers, the DMT along with 65 lbs of ethylene glycol were charged to the still. Next, the 1% slurry of Kevlar® (1% fiber in ethylene glycol) microfiber and the Zonyl® MP-1600N are added to the still. The Zonyl® MP-1600N was added to the still in powder form. Finally, manganese acetate as a solution in ethylene glycol was added as the ester exchange catalyst, and antimony trioxide as a solution in ethylene glycol is added as the polycondensation catalyst.

The temperature of the still was raised to about 240° C. and approximately 15 liters of methanol distillate is recovered. The molten monomer, bis(2-hydroxyethyl terephthalate), that was produced was then dropped from the monomer distillation still to the clave portion of the autoclave.

All of the ingredients were mixed, agitated and polymerized by increasing the temperature to a final polymerization temperature of about 285° C. The pressure was reduced to a final pressure of about 1 mm Hg. The polymer was extruded through a 33 hole casting plate into strands, which are quenched, cut and boxed. The polymers were crystallized and solid state polymerized in a horizontal tumble reactor. The polymers were crystallized at 135° C. and solid state polymerized at about 237° C. for a total heating time of 24 hrs.

The peak crystallization and melting point temperatures set forth in Table C for each of the Example 4-8 polymers were determined via the DSC method. The Electron Spectroscopy for Chemical Analysis (ESCA) of each of the Example 4-8 polymer compositions as set forth in Table C was determined by analyzing the surface of each polymer. These results confirmed that the fluoropolymer was contained in the polymer samples, wherein the "F atom %" quantifies the percentage of fluorine atoms observed, and the "F/C ratio" quantifies the ratio of fluorine to carbon atoms observed in the sample.

TABLE C

| Example | % Kevlar ® | % Zonyl ®-MP 1600N | lbs DMT | lbs 1% Kevlar ® Slurry | lbs Zonyl ®-MP 1600N powder | DSC Peak Crystallization Temp. ° C. | DSC Peak Melting Point Temp. ° C. | ESCA F atom % | ESCA F/C Ratio |
|---|---|---|---|---|---|---|---|---|---|
| 4 | 0.1 | 1 | 99 | 10 | 1 | 185 | 245 | 0.9 | 0.010 |
| 5 | 0.1 | 5 | 95 | 10 | 5 | 184 | 241 | 3.2 | 0.041 |
| 6 | 0.1 | 10 | 90 | 10 | 10 | 188 | 245 | 18 | 0.270 |
| 7 | 0.2 | 5 | 95 | 20 | 5 | 184 | 248 | 3.4 | 0.041 |
| 8 | 0 | 5 | 100 | 0 | 5 | 186 | 248 | 10 | 0.140 |

Examples 9-14

134.75 g bis(2-hydroxyethyl)terephthalate, 0.0468 g manganese (II) acetate tetrahydrate, and 0.0365 g antimony (III) oxide were added to a 250 ml glass flask. Table D identifies the amount of microfiber and micropowder added to each 250 ml flask. The resulting reaction mixture was then stirred. The reaction mixture was subsequently heated to 180° C. under a slow nitrogen purge and held for about 0.5 hrs. The reaction mixture was then heated to 285° C. and held again for about 0.5 hrs. Finally, the reaction mixture was staged to full vacuum (less than 100 m torr) at 285° C. while being stirred for the period of time shown in Table D. The vacuum was released and the reaction mass was cooled to room temperature.

The laboratory relative viscosity (LRV) and crystalline melt point of each of the Example 9-14 reaction products was obtained and set forth in Table D. The crystalline melt point was obtained by using DSC methods. The Table D data exemplifies the polyester compositions made by various methods using powder or slurry forms of the microfiber and micropowder ingredients. In particular, as shown by Examples 12 and 14, the combining of two slurries improves the process as is apparent by the reduced vacuum time required.

TABLE D

| EXAMPLE | % Microfiber and % Micropowder in Final Polyester Composition: % Kevlar ® | % Microfiber and % Micropowder in Final Polyester Composition: % Zonyl ®-MP 1600N | Amount and Form of Microfiber and Micropowder Added to the Polyester: Amount of 1.5% Kevlar ® slurry (gm) | Amount of 3% Zonyl ®-MP 1600N Slurry (gm) | Amount Zonyl ®-MP 1600N Powder (gm) | Amount of 1.5% Kevlar ® and 1.5% Zonyl-MP 1600N Slurry (gm) | Processing Conditions: Time at Full Vacuum (min) | Properties of Final Polyester Composition: LRV | Properties of Final Polyester Composition: DSC Crystalline Melt Point (° C.) |
|---|---|---|---|---|---|---|---|---|---|
| 9 | 0.25 | 0.5 | 17.2 | — | 0.0513 | — | 50 | 20.5 | 254 |
| 10 | 0.25 | 5 | 18.0 | — | 5.4 | — | 88 | 16.3 | 252 |
| 11 | 0.25 | 10 | 18.8 | — | 11.3 | — | 54 | 18.4 | 251 |
| 12 | 0.25 | 0.25 | — | — | — | 17.2 | 47 | 19.1 | 248 |
| 13 | 0.25 | 5 | 18.0 | 180 | — | — | 85 | 22 | 247 |
| 14 | 5 | 5 | — | — | — | 365 | 45 | 7.6 | 251 |

What is claimed is:

1. A microfiber and micropowder slurry comprising at least one liquid medium, at least one microfiber, and at least one micropowder, wherein the at least one microfiber comprises an organic microfiber.

2. The slurry of claim 1, wherein the organic microfiber comprises a polymeric material selected from aliphatic polyamides, polyesters, polyacrylonitriles, polyvinyl alcohols, polyolefins, polyvinyl chlorides, polyvinylidene chlorides, polyurethanes, polyfluorocarbons phenolics, polybenzimidazoles, polyphenylenetriazoles, polyphenylene sulfides, polyoxadiazoles polyimides, aromatic polyamides cellulose, cotton, silk, wool, and mixtures thereof.

3. The slurry of claim 1, wherein the organic microfiber comprises an aromatic polyamide polymer selected from poly (p-phenylene terephthalamide), poly (m-phenylene isophthalamide), and mixtures thereof.

* * * * *